United States Patent [19]
Lembke

[11] Patent Number: 5,024,247
[45] Date of Patent: Jun. 18, 1991

[54] CONTROL MOTOR FOR A SERVO VALVE

[75] Inventor: Herbert Lembke, Lohr, Fed. Rep. of Germany

[73] Assignee: Mannesmann Rexroth GmbH, Lohr, Fed. Rep. of Germany

[21] Appl. No.: 512,437

[22] Filed: Apr. 23, 1990

[30] Foreign Application Priority Data

Apr. 21, 1989 [DE] Fed. Rep. of Germany ....... 3913239

[51] Int. Cl.[5] ............................................ G05D 16/20

[52] U.S. Cl. ..................................... 137/82; 335/229; 335/276

[58] Field of Search ...................... 310/15, 17, 22, 24, 310/29, 154, 191; 318/135; 137/625.62, 625.64, 82, 83; 251/129.08; 335/219, 229, 230, 266, 276, 278

[56] References Cited

U.S. PATENT DOCUMENTS

| | | | |
|---|---|---|---|
| 3,777,784 | 11/1973 | Nicholson | 137/625.62 |
| 3,910,314 | 10/1975 | Nicholson | 137/625.62 |
| 4,682,063 | 7/1987 | Lembke | 137/625.62 X |

FOREIGN PATENT DOCUMENTS

| | | |
|---|---|---|
| 1195116 | 6/1965 | Fed. Rep. of Germany . |
| 2419311 | 2/1975 | Fed. Rep. of Germany . |
| 3338602 | 5/1985 | Fed. Rep. of Germany . |
| 3402768 | 8/1985 | Fed. Rep. of Germany . |
| 3501836 | 7/1986 | Fed. Rep. of Germany . |

OTHER PUBLICATIONS

Ingenieur Digest No. 3, Mar. 1970, pp. 67–74; 77–82.
Der Hydraulik Trainer, RD99391/6.78, pp. 149 and 150.
The Hydraulic Trainer, RE 00 301, pp. 149 and 150.

*Primary Examiner*—Alan Cohan
*Attorney, Agent, or Firm*—Cushman, Darby & Cushman

[57] ABSTRACT

A control motor for a servo valve which includes pole screws defining an armature space, first and second coils supported by the pole screws, respectively, a soft metal armature which is resiliently mounted to a thin walled tube and a permanent magnet which polarizes the armature. An annular body carrying said pole screws and providing for a magnetic path between the pole screws and the permanent magnet.

9 Claims, 4 Drawing Sheets

CONTROL MOTOR FOR A SERVO VALVE

DESCRIPTION

1. Technical Field

This invention relates generally to a control motor, and, more particularly, to a control motor for a servo valve.

2. Background Art

In the book 'The Hydraulic Trainer' of Mannesmann Rexroth an electric control motor is described at pages 149 and 150, said control motor forming together with an hydraulic amplifier the first stage of a two-stage directoral servo valve. The control motor (with a permanent magnet, control coils, and an armature with a flapper plate) changes a small current signal into a proportional flapper plate movement. The armature and the flapper plate are one part, which is shock-mounted to a thin-walled flexible pipe. At the same time, the pipe seals the control motor with respect to the hydraulic fluid, so that the control motor is dry. The control coils are energised by means of a current signal and the armature is deflected against the spring force of the pipe. The direction of deflection is determined by the polarity of the input current.

The German published application no. 24 19 311 (corresponding with your Ser. No. 388,897 of Aug. 16, 1973 U.S. Pat. No. 3,910,314) relates to a control motor using for energisation purposes a permanent magnet which is 'double-polarised' i.e. uses two poles of the same polarity. Such a magnet has the disadvantage that its magnetisation may not be uniform, with the result that the armature may be subjected to non-uniform effects. Because of this non-uniformity a calibration operation is required. The U.S. Pat. No. 4,682,063 discloses a control motor in which a 'single polarised' permanent magnet is located adjacent to the armature. Said permanent magnet is preferably made of cobalt-samarium-material. Said known control motor is compact and also useful for small power applications and avoids an unequal energisation by the permanent magnet.

It is an object of the present invention to provide an improved control motor, in particular for a servo valve. It is another object of the invention to further improve the control motor of U.S. Pat. No. 4,682,063 using a single polarised permanent magnet.

The control motor known from U.S. Pat. No. 4,682,063 uses a support member of generally u-shaped design for supporting the magnet coils and the pole pieces. Starting from an approximately annular base plate oppositely arranged arms project upwardly and form in between and also with respect to the base plate a space within which the pole pieces, the control coils, the armature and also the permanent magnet are located. On both ends of the arms a magnetic flux-conducting member carrying the permanent magnet is arranged, so as to guide the magnetic field lines extending from the one pole of the magnet while the arms to the pole pieces and back to the other pole of the magnet. The manufacturing of the relatively complex support member is costly. For instance, the large u-shaped recess has to be machined out of circular work piece. Thus, the base plate which forms the bottom has to have a sufficient thickness so as to avoid a magnetic saturation. The arms projecting away from the base plate may cause problems with regard to stability and vibrations.

Besides a reduced stability the actual height of the known control motor may cause problems.

It is a still further object of the present invention to avoid the disadvantages of the prior art and to provide for a compact as well as efficient control motor. In accordance with another object of the invention, the control motor is to be realised with a single polarised magnet like the control motor shown in U.S. Pat. No. 4,682,063.

DISCLOSURE OF THE INVENTION

In accordance with the present invention a control motor is provided, which is particularly useful for a servo valve. The control motor comprises a support member adapted to be mounted at a housing component. First and second pole means are fixedly mounted to said support member. Control coils are located on said pole means and can be energised by a current signal. An armature consisting of a magnetically soft material is located in an armature space which is formed between the oppositely arranged first and second pole means. A resilient tube comprises a mounting end by means of which the tube is mounted at said housing component. The other end of the tube carries the armature. A flapper element is mounted to the armature and is located in said tube and extends out of said tube at the mounting end of the tube so as to be arranged between two nozzles or jets. If the armature moves the flapper element is moved more or less towards said nozzles, so as to have an effect onto the fluid flow exiting from said nozzles. Adjacent to the armature a permanent magnet is located so as to create a magnetic field in the armature space as well as the adjacent air gaps. In said air gaps the magnetic field of the permanent magnet and the magnetic field generated by the control coils superimpose so as to effect a reciprocal movement of the armature and also of the flapper element if a control signal is applied to said control coils. The support member is shaped as an annular body and a magnetic flux-conducting member carrying the permanent magnet is fixedly mounted to one end side of said annular body. The other end side of the annular body is connected with the housing component and comprises a center recess for the passage of the tube.

With a support member in the form of an annular body a high stability as well as a low height is achieved. The annular body comprises, as is suggested by the term 'annular' , an inner space which is completely surrounded. The annular space is enclosed by an annular wall having preferably a constant height. Pole means, preferably two oppositely arranged pole pieces, project into said inner space and support control coils. The pole pieces end inwardly in pole surfaces between which the armature is located. Preferably, the armature has the form of a parallelepiped.

Adjacent to the armature a single polarised magnet is located which preferably has in general the form of a parallelepiped. The magnet is supported by a flux-conducting member. The flux-conducting member extends in accordance with the invention in the direction of the longitudinal extension of the magnet and the armature between the control coils and is located at the upper surface of the annular body. Thus, the magnetic field lines coming from the magnet can enter the annular body via the flux-conducting member on both sides. In that annular body or ring body the field lines extend in opposite directions each about 90° so as to reach the pole pieces, from where said magnetic lines extend back to the magnet via the armature. In the control motor of U.S. Pat. No. 4,682,063 the flux-conducting member extends transversely with respect to the magnet in the direction of the axis of the pole pieces, in accordance with the present invention, the flux-conducting member is located in the direction of the magnet. Preferably, the magnet is fixedly mounted to the flux-conducting member. The flux-conducting member is, for instance, bonded or soldered to the flux-conducting member or it is mounted by means of a dovetail connection.

Preferred embodiments of the invention are disclosed in the dependent claims.

With the above and other objects, this invention results in the novel construction, combination and arrangement of parts substantially as hereinafter described and more particularly defined by the appended claims, it being understood that such changes in the precise embodiment of the herein disclosed invention may be made as comes within the scope of the claims.

The accompanying drawings illustrate one complete example of the physical embodiment of the invention constructed according to the best mode so far devised for the practical application of the principal thereof, and in which FIG. 1 is a sectional view through FIG. 4 on the plane of the line 1—1 of a servo valve;

Figure 1:
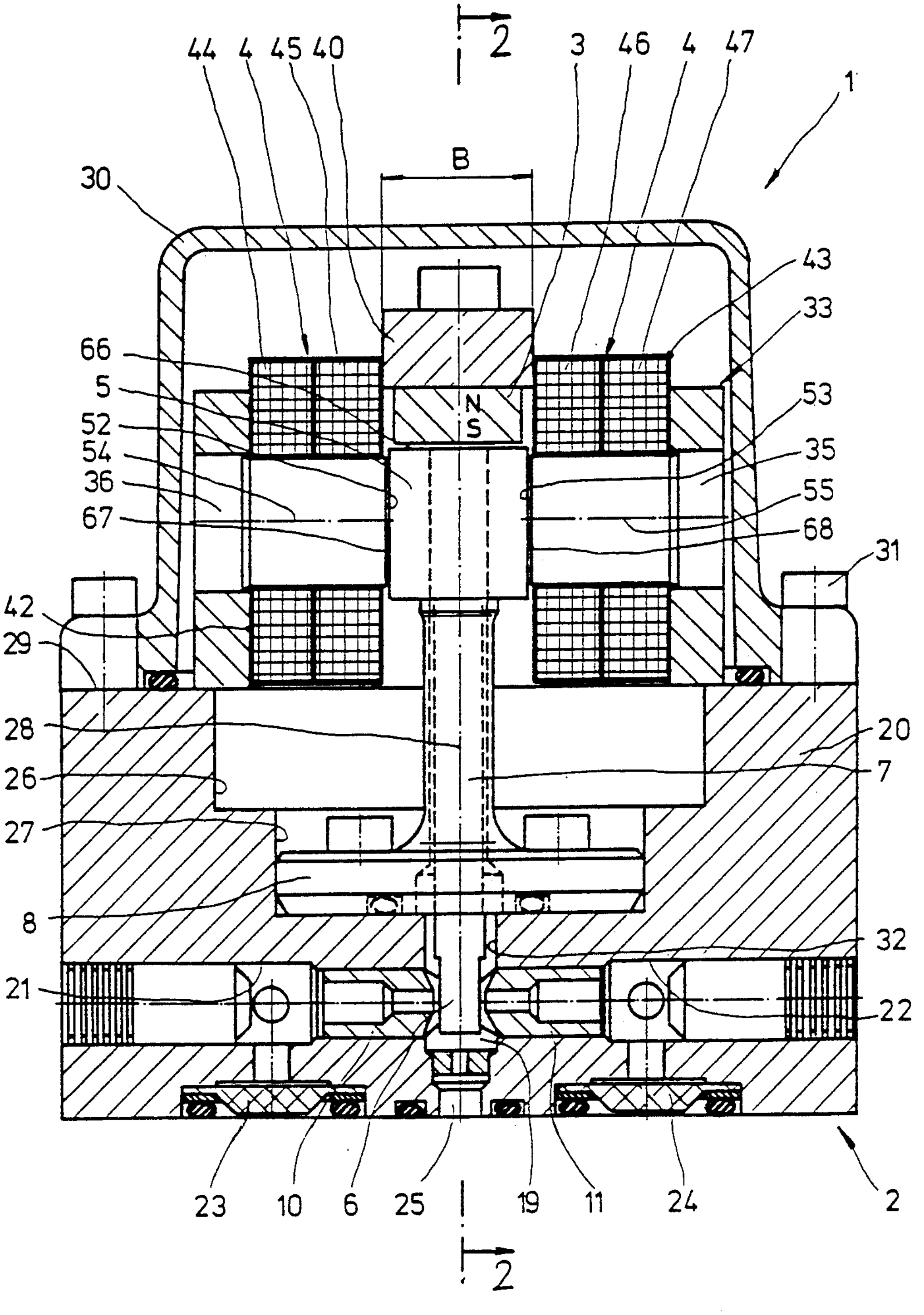

Referring now to FIG. 1–4 the control motor 1 of the invention will be described. The electric control motor 1 is shown—particularly in FIG. 1—together with an hydraulic amplifier tool. As is known, the electric control motor 1 comprises a single polarised permanent magnet 3 as well as control coils 4, so as to cause the movement of an armature 5 which is located adjacent to the control coils 4 as well as the permanent magnet 3. The movement of the armature 5 occurs in correspondence with the size of the control signal or control current supplied to the control coils 4. The armature 5 transmits its movement to a flapper element 6. The flapper element 6 extends within a resilient tube 7 and is mechanically coupled to the armature 5, so as to transmit the movement of the armature to the hydraulic amplifier 2.

The resilient tube 7 forms together with a support plate 8 a single piece. The support plate 8 is fixedly mounted to a housing component (base plate) 20. The lower end (FIG. 1) of the flapper element 6 is located between two control nozzles or jets 18 and 11 of the hydraulic amplifier 2. The control jets are located in corresponding bores 21 and 22, respectively, of the base plate 20. Valve ports and user ports 23 and 24, respectively are connected with the nozzles 10 and 11, respectively. Another port, i.e. tank port 25, provides the connection to a space 19 between the control nozzles 10 and 11.

The longitudinal axis of the control motor 1 is referred to by reference number 28. The housing member or housing component 20 comprises an axial recess 26 extending downwardly from the upper surface. Adjacent to that axial recess 26 an axial bore 27 is provided. The axial bore 27 is connected with a space 19 via a bore 32 so that the flapper element (flapper plate) 6 can pass therethrough. A cover 30 encloses the control motor and is mounted by means of screw 31 to the housing component 20. The support member in the form of an annular body of ring body 36 and the flow conducting member 40 are located on the upper surface 29 of the housing component 20. Bolts 37, 38 (see FIG. 2) extend through that flux-conducting member 40 and said housing component 20 for mounting component 40 and body 33 thereto. The annular body 33 itself is mounted to the housing component 20 by means of additional bolts 39 (see FIG. 3).

The bolts 37, 38 extend through flux-conducting member 40 which in turn extends over the width b1 of the annular body 33. A lower surface 50 of said flux-conducting member 50 is placed on one end side (upper surface) 48 of the annular body 33. The flux-conducting member 40 is like a bracket and has, in general, the form of a parallelepiped. Its length corresponds approximately with the diameter or the width bl of the annular body 33 (see FIGS. 2 and 4). The width B of the flux-conducting member 40 (see FIGS. 1 and 3) corresponds in substance with the spacing distance between the pole surfaces 52 and 53 of the pole means. The pole means are provided in the form of pole pieces, more specifically in the form of pole screws 35 and 36. The pole screws 35 36 are oppositely located and are pressed into respective bores of the annular body 33. The pole screws support at the respective inwardly projecting parts control coils 4. The pole pieces have transverse axes 54 and 55 which extend transversely with respect to the longitudinal axis 28 of the control motor.

Figure 2:
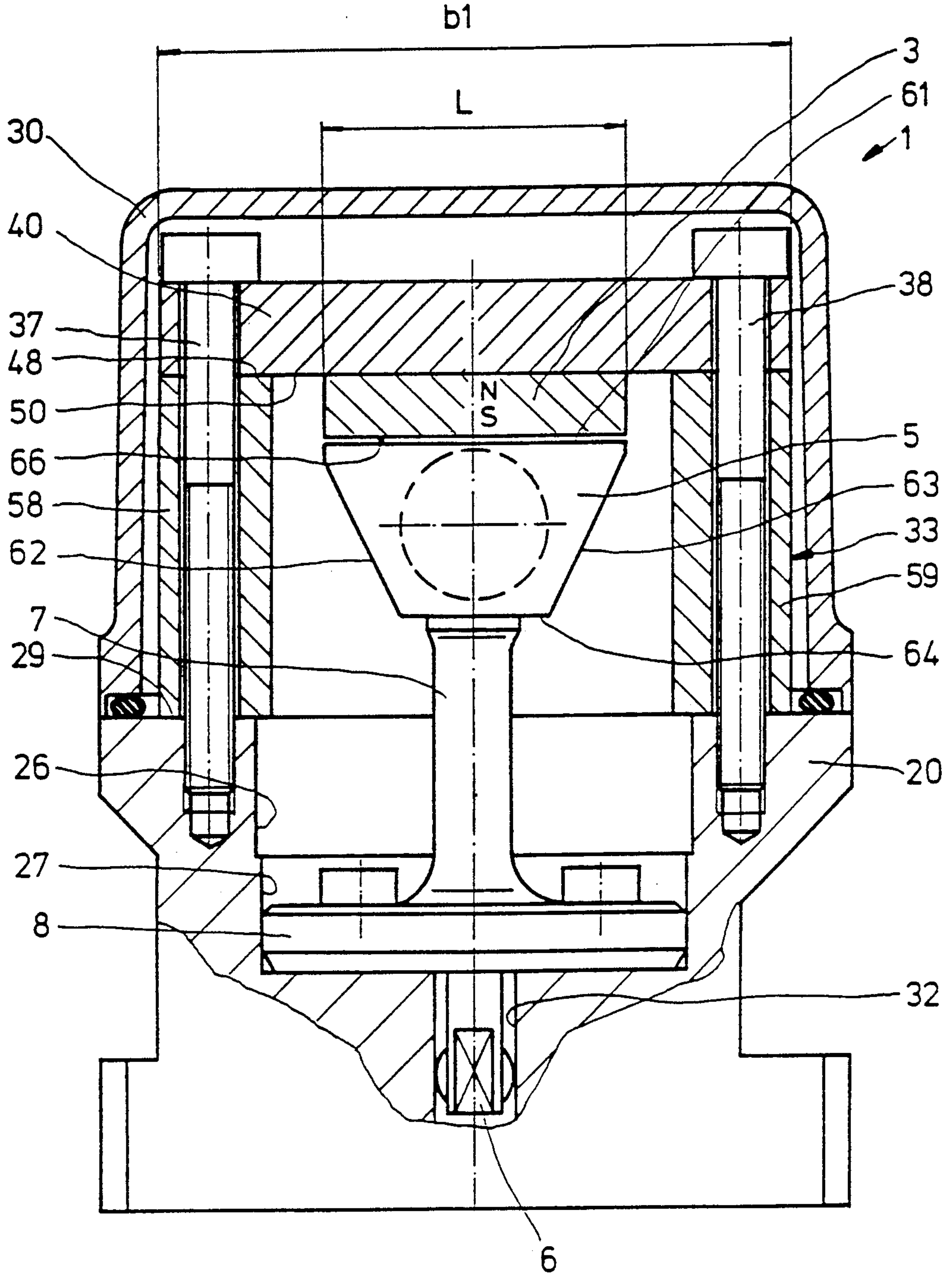
FIG. 2 is a partial sectional view through FIG. 1 or 4 on the plane of the line 2—2 in FIG. 4.
Figure 3:
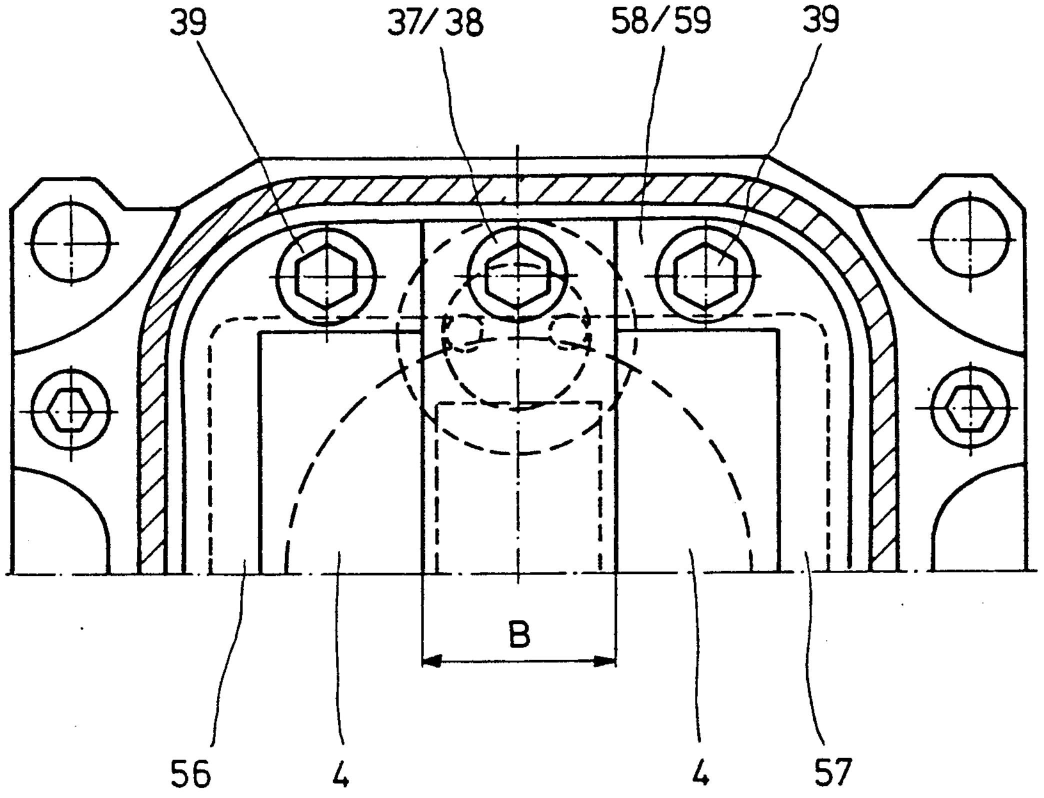
FIG. 3 is a partial plan view of the control motor of FIG. 1, with a cover being removed.

In accordance with FIG. 3 the annular body 33 is not in the form of a circular ring, but its shape is substantially square having two narrower legs 56, 57 (see FIG. 3) and two wider legs 58, 59 (see FIG. 2). As will be noted from FIGS. 1 and 2 the annular body 33 has round the entire annular circumference preferably the same height.

The permanent magnet 3 has a polarity shown schematically in FIG. 2. Permanent magnet 3 is fixedly mounted to the lower surface 50 of the flow conducting member 40, for example by means of bonding (glueing). The length L of the magnet 3 corresponds with the largest length of the armature 5 as is shown in FIG. 2. In accordance with FIG. 2 the armature 5 can have a symmetric form in a side elevational view taken from the pole surfaces 52 or 53. The upper surface 61 of the armature 5 has a length corresponding with the length L of the magnet 3. The armature tapers via the side surfaces 62 and 63 towards a bottom surface 64 which has approximately a length corresponding to L/2. The pole surfaces 52, 53 are completely located within the area defined by sides 61, 62, 64, and 63 of the armature 5 (see FIG. 2 in which the shape of one surface is shown by a dashed line). The air gap between the permanent magnet 3 and the armature 5 is referred to by reference numeral 66.

In the embodiment shown each of the control coils 4 comprises two separate coils 44, 45, and 46, 47, respectively which are located on a coil body 42 and 43, respectively. The manner in which the coils are supplied with a control current is well known and thus it does not have to be explained.

Figure 4:
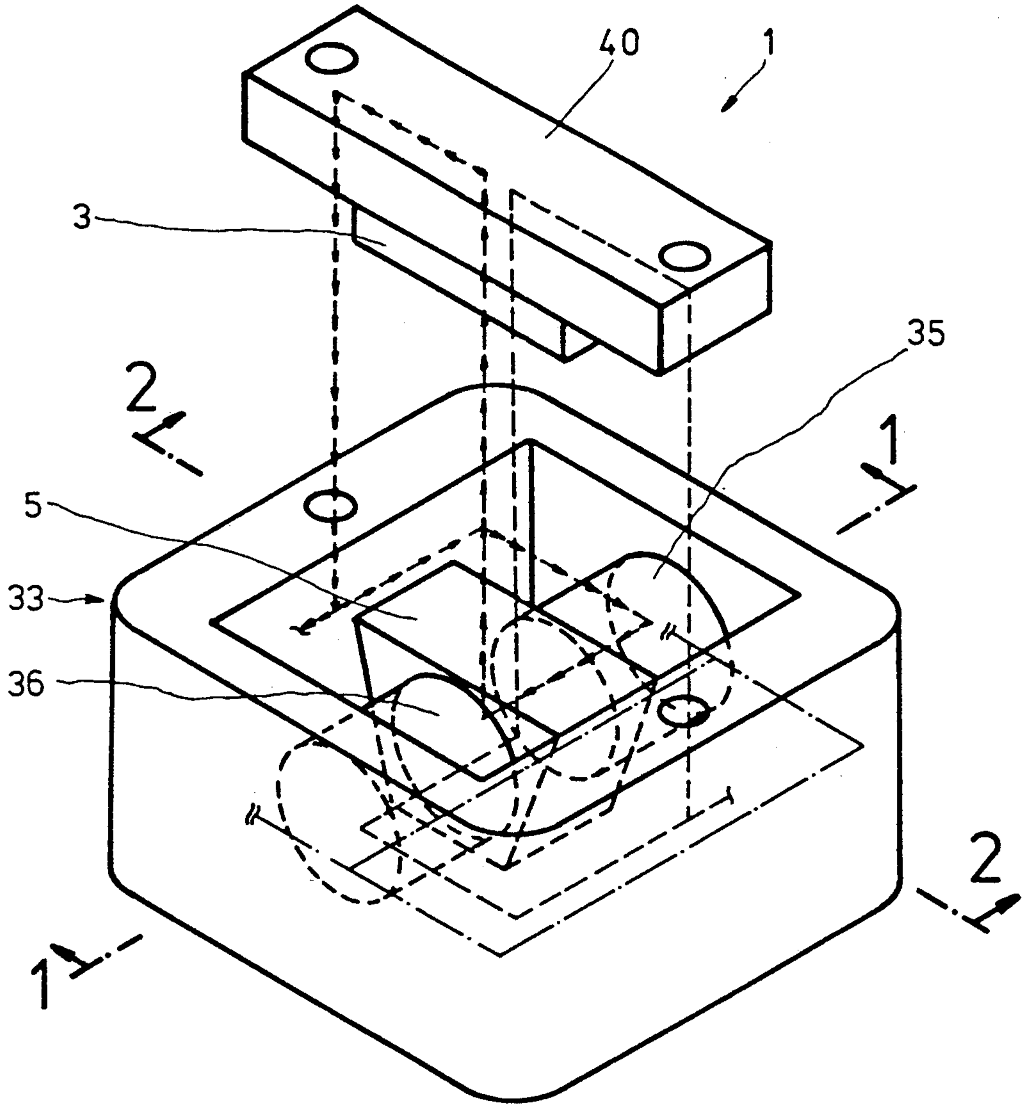
FIG. 4 is a schematic isometric representation of the control motor of FIG. 1.

FIG. 4 shows in a schematic representation what is disclosed in more detail in the embodiment shown in FIG. 1–3. In FIG. 4 two magnetic field lines of the permanent magnet 3 are shown. One magnetic line is indicated by a plurality of arrows, and the other field line is shown by a dashed line. Moreover, one magnetic field line of one control coil located on a pole piece is represented by a 'dash-dot'-line. Further, FIG. 4 discloses the pole pieces 35 and 36 not in a form of pole screws, but unitary with the annulus or ring 33.

It can be clearly recognised in FIG. 4 that the side wall is used to guide the magnetic flow originating from the magnet 3 about approximately 90° so as to guide it then to the pole pieces 35, 36.

I claim:

1. A control motor for a servo valve, comprising, a support member (33) adapted to be mounted on a housing component (20), at least first and second pole means (35,36) mounted at said support member (33), control coils (4) adapted to receive a control signal and located on said pole means (35,36), an armature (5) made of a magnetically soft material and arranged in an armature space which is defined between said oppositely located first and second pole means (35,36), a resilient tube (7) having a mounting end with which the tube (7) is mounted to the housing component (20) and an opposite end which supports said armature (5), a flapper element (6) fixedly mounted to said armature (5) and located within said tube (7) so as to extend out of said tube (7) at the tube mounting, and two spaced nozzles (10,11) located in said housing component, with said flapper element extending between said nozzles, such that the movement of the armature (5) leads to a movement of the flapper element towards one or the other nozzle, so as to control the fluid flow which comes out of said nozzles, a permanent magnet (3) located adjacent said armature (5) for creating a magnetic field in the armature space and the adjacent air gaps, within which said magnetic field is superimposed by the magnetic field generated by the control coils, so as to cause a reciprocal movement of the armature, and, consequently of the flapper element (6) in accordance with a control signal applied to said control coils, said support member (33) having the form of an annular body (33) and having one end surface and oppositely thereto another end surface, a flux-conducting member (40) carrying said permanent magnet being fixedly mounted to said one end surface, and the other end surface of the annular body (33) being fixedly connected with the housing member (20) which comprises a centrally located recess for the passage of said tube.

2. The control motor of claim 1 wherein said flux-conducting member (40) extends along the longitudinal direction of the armature (5), i.e. transversely with respect to the direction of movement of the armature (5).

3. The control motor of claim 1 wherein the support member is formed such that the magnetic flux coming from the permanent magnet and guided through the flux-conducting member is directed to said pole means.

4. The control motor of claim 1 wherein the annular body (33) comprises a closed side wall such that the magnetic flux of the flux-conducting member (40) which enters the annular body (33), flows through that annular body for about 90° towards said pole means, then through an air gap into the armature (5), and from there via another air gap back to the permanent magnet (3).

5. The control motor of claim 1 wherein said pole means are pole members and, in particular, pole screws (35,36) which are located in, preferably screwed into corresponding bores of the walls of the annular body.

6. The control motor of claim 5, wherein said pole screws extend away from the inner wall of said annular body and project towards each other, said armature (5) extending substantially transversely with respect to end surfaces of said pole screws.

7. The control motor of claim 1, wherein said permanent magnet 3 is bonded, i.e. glued, to s!id flux-conducting member.

8. The control motor of claim 1, wherein said housing member is adapted to receive at the same time the control unit comprising the ring body with the resilient tube, the armature, and the flapper plate.

9. The control motor of claim 1, wherein the flux-conducting member is in the form of a parallelepiped.

* * * * *